United States Patent [19]

Green et al.

[11] 3,986,546

[45] Oct. 19, 1976

[54] METHOD OF MAKING A FOUNDRY MOLD OR CORE WITH AN ANAEROBICALLY CURED ADHESIVE

[75] Inventors: George Edward Green, Cambridge; James Leonard Greig, Saffron Walden, both of England

[73] Assignee: Ciba-Geigy Corporation, Ardsley, N.Y.

[22] Filed: Mar. 20, 1974

[21] Appl. No.: 452,904

[30] Foreign Application Priority Data

Apr. 14, 1973 United Kingdom .............. 18109/73

[52] U.S. Cl. .................................. 164/43; 164/349; 260/42.52; 264/83; 264/85; 264/126; 526/227; 526/328

[51] Int. Cl.[2] ........................................... B22C 1/22

[58] Field of Search ............... 264/83, 85, 102, 240, 264/109, 126; 260/998.18 X, 42.52, 89.5 R; 106/38.2; 164/43

[56] References Cited

UNITED STATES PATENTS

| | | | |
|---|---|---|---|
| 2,895,950 | 7/1959 | Krieble | 260/89.5 R |
| 3,465,076 | 9/1969 | Asami et al. | 264/255 |
| 3,547,851 | 12/1970 | Frauenglass | 260/89.5 R |
| 3,661,876 | 5/1972 | Wegemund et al. | 260/89.5 R |
| 3,679,703 | 7/1972 | Conrady et al. | 260/998.18 |
| 3,904,731 | 9/1975 | Orkin et al. | 260/89.5 R |

*Primary Examiner*—Jeffery R. Thurlow
*Attorney, Agent, or Firm*—Vincent J. Cavalieri

[57] ABSTRACT

Solid particulate materials are bonded together to form a foundry mold or core by i. forming a mixture of the particles and an anaerobically-curing adhesive and moulding the mixture to the desired shape, and ii. causing the adhesive to cure and bond the particles together by maintaining the shaped article in a substantially oxygen-free environment.

The anaerobic adhesive may comprise, as monomer, an ester of an acrylic acid, with a hydroperoxide or peroxide as a polymerization catalyst, and the oxygen-free environment may be produced by displacing air with nitrogen or other inert gas or vapor.

The method described is particularly suited for the production of foundry moulds and cores from sand or other particulate material.

23 Claims, No Drawings

METHOD OF MAKING A FOUNDRY MOLD OR CORE WITH AN ANAEROBICALLY CURED ADHESIVE

This invention relates to a method of bonding together solid particulate materials to form shaped articles. The method is especially applicable to the binding of refractory particulate material for making foundry cores and moulds and the invention will be described with especial reference to making such cores and moulds. However, the method is also useful in making other kinds of shaped articles from particulate materials, including exothermically-reacting compositions, for example.

In the production of foundry moulds and cores, sand or other refractory particulate material is bonded together by means such as the deposition of a silica hydrogel, achieved by coating the particles with aqueous sodium silicate and moulding them to the desired shape, then treating with carbon dioxide or other acid gas and allowing the mixture to harden in its molded shape. Other methods which have been used involve coating the particles with a curable synthetic resin composition, such as a urea-formaldehyde resin composition, and curing the composition.

A disadvantage of methods hitherto available is that the development of a cohesive strength sufficient for the cores to be handled under foundry conditions usually takes several hours, sometimes twelve or more: currently, the foundry industry seeks, for more economical working, methods which will provide cores attaining adequate cohesive strength within, at most, one hour yet which employ only low proportions of bonding agent.

We have now found that these requirements can be at least substantially met by the use of anaerobically-curing adhesives. These adhesives, which usually contain acrylate ester monomers, are stable on storage in air or other oxygen-containing gas but, in the presence of a catalyst, they polymerise when the oxygen is excluded. The reason usually advanced for this behaviour is that radicals continuously generated in the adhesive composition react with the oxygen while this is available: when, however, oxygen is excluded, the radicals induce polymerisation of the monomer.

This invention accordingly provides a method of making a shaped article from particulate solid material which comprises i forming a mixture of the particles and an anaerobically-curing adhesive and moulding the mixture to the desired shape, and ii causing the adhesive to cure and bond the particles together by maintaining the shaped article in a substantially oxygen-free environment.

Preferably the substantially oxygen-free environment is attained by displacing air or other oxygen-containing gas by a gas or vapor which does not inhibit curing of the anaerobic adhesive, nitrogen being particularly suitable, but it may also be attained by pumping out the air. Preferably, too, the shaped object is maintained in a substantially oxygen-free environment for a minimum of 10 minutes so that curing has advanced substantially before air can seep back into the interstices of the shaped object and so inhibit further curing. Ingress of air while the adhesive is curing can also be prevented by wrapping the shaped article in an air-impermeable film or by coating it with an air-impermeable film sealing composition formed in situ by coating the surface with an aerobically-curing agent for the adhesive.

The preferred anaerobic adhesives comprise a. an ester of an acrylic acid, b. a hydroperoxide or peroxide as polymerisation catalyst for (a), and, if desired.

c. an accelerator for the polymerisation of (a).

Suitable esters of acrylic acids include those of the general formula

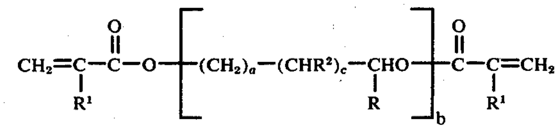

I where $a$ is an integer of 1 to 8, $b$ is an integer of 1 to 20, $c$ is zero to 1, R denotes $-H$, $-CH_3$, $-C_2H_5$, $-CH_2OH$, or $$-CH_2OC(=O)C(R^1)=CH_2,$$

$R^1$ denotes $-H$, $-Cl$, $-CH_3$, or $-C_2H_5$, and $R^2$ denotes $-H$, $-CH$, or $$-OC(=O)C(R^1)=CH_2.$$

Preferred among such compounds are those of formula I where $a$ is 1, $b$ is from 2 to 5, $c$ is zero, and R and $R^1$ each denote $-H$ or $-CH_3$.

Compounds of formula I are described in United Kingdom Patent Specification No. 824677.

Other suitable esters are of the general formula

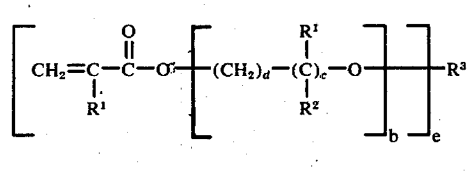

II where $b$, $c$, $R^1$, and $R^2$ have the meanings assigned above, $d$ is zero or a positive integer, provided that $c$ and $d$ are not both zero, $e$ is 1, 2, 3, or 4, and $R^3$ denotes an organic radical of valency $e$ linked through a carbon atom or carbon atoms thereof to the indicated $b$ oxygen atoms.

Preferred among such compounds are those where, in formula II, $b$, $c$, and $d$ are each 1, $R^1$ is —H or $—CH_3$, and $R^3$ is the hydrocarbon residue of an aliphatic alcohol containing from 1 to 6 carbon atoms, such as $—CH_3$ or

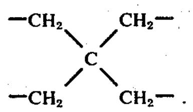

Compounds of formula II are described in United Kingdom Patent Specification No. 1228479.

Yet other suitable esters are those of the formula

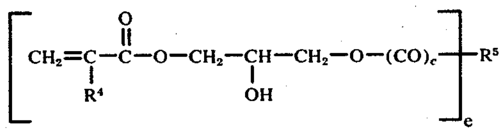

III where $c$ and $e$ have the meanings previously assigned, $R^4$ denotes —H or $—CH_3$, and $R^5$ denotes an organic radical of valency $e$, linked through a carbon atom thereof other than the carbon atom of a carbonyl group.

More particularly, when $c$ is zero, $R^5$ may denote the residue, containing from 1 to 18 carbon atoms, of an alcohol or phenol having $e$ hydroxyl groups.

$R^5$ may thus represent an aromatic, araliphatic, alkaromatic, cycloaliphatic, heterocyclic, or heterocycloaliphatic group, such as an aromatic group containing only one benzene ring, optionally substituted by chlorine or by alkyl groups each of from 1 to 9 carbon atoms, or an aromatic group comprising a chain or two to four benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 9 carbon atoms, or, preferably, a saturated or unsaturated, straight or branched-chain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae $—C_6H_5$ and $—C_6H_4CH_3$, in which the case $e$ is 1, $—C_6H_4C(CH_3)_2\ C_6H_4—$, and $—C_6H_4CH_2C_6H_4—$, in which case $e$ is 2, and

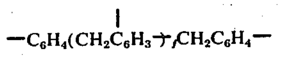

where $f$ is 1 or 2, in which case $e$ is 3 or 4, and the aliphatic groups of formula

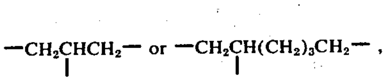

in which case $e$ is 3, of formula $—(CH_2)_4—$, $—CH_2CH{=}CHCH_2—$, $—CH_2CH_2OCH_2CH_2—$, or $—(CH_2CH_2O)_2CH_2CH_2—$, in which case $e$ is 2, or of the formula $—(CH_2)_3CH_3$, $—(CH_2)_4OH$, $—CH_2CH{=}CH_2$, or $—CH_2CH{=}CHCH_2OH$, in which case $e$ is 1.

When $c$ is 1, $R^5$ may represent the residue, containing from 1 to 60 carbon atoms, of an acid having $e$ carboxyl groups, preferably a saturated or ethylenically-unsaturated, straight chain or branched aliphatic hydrocarbon group of from 1 to 20 carbon atoms, which may be substituted by chlorine atoms and which may be interrupted by ether oxygen atoms and/or carbonyloxy groups, or a saturated or ethylenically-unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms, which may be substituted by chlorine atoms.

Further preferred are such compounds in which $R^5$ represents a saturated or ethylenically-unsaturated straight chain or branched aliphatic hydrocarbon group of from 1 to 8 carbon atoms, optionally substituted by a hydroxyl group, or a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula $—CH_3$, $—CH_2CH_3$, $—CH_2CH(OH)CH_3$, $—CH_2Cl$, and $—C_6H_5$, in which case $e$ is 1, and $—CH_2CH_2—$, $—CH{=}CH—$, and $—C_6H_4—$, in which case $e$ is 2.

Compounds of the general formula III are described in United Kingdom Pat. Specifications Nos. 831056, 977361, 989201, 1006587, 1054614, 1146474, 1195485, 1222369, 1235769, 1241851, 1262692, and 1266159, Canadian Pat. Specifications Nos. 804670 and 888274, U.S. Pat. No. 3221043, and French Pat. Specification No. 1531224.

Still other suitable esters are acrylate-urethanes and acrylate-ureides of the general formula

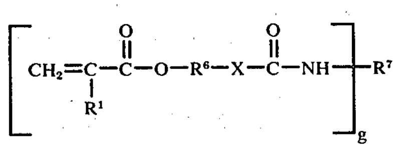

IV where $R^1$ has the meaning assigned above, $R^6$ denoes a divalent aliphatic, cycloaliphatic, aromatic, or araliphatic group, bound through a carbon atom or carbon atoms thereof to the indicated —O—atom and —X—atom or group, X denotes —O—or $—N(R^8)—$, where $R^8$ stands for —H or an alkyl radical of from 1 to 8 carbon atoms, $g$ is an integer of at least 2 and at most 6, and $R^7$ denotes a *g*-valent cycloaliphatic, aromatic, or araliphatic group bound through a carbon atom or carbon atoms thereof to the indicated NH groups.

Preferably $R^6$ denotes a divalent aliphatic group of 2 to 6 carbon atoms and $R^7$ denotes one of the following:

a divalent aliphatic group 2 to 10 carbon atoms, such as a group of formula $-(CH_2)_6-$, $-CH_2C(CH_3)_2CH_2CH(CH_3)(CH_2)_2-$, or $-CH_2CH(CH_3)CH_2C(CH_3)_2(CH_2)_2-$; or a phenylene group, optionally substituted by a methyl group or a chlorine atom;

a naphthalene group:

a group of formula $-C_6H_4C_6H_4-$, $-C_6H_4CH_2C_6H_4-$, or $-C_6H_4C(CH_3)_2C_6H_4-$;or a mononuclear alkylcycloalkylene or alkylcycloalkylalkylene group of from 6 to 10 carbon atoms, such as methylcyclohex-2,4-ylene, methylcyclohex-2,6-ylene, 1,3,3-trimethylcyclohex-5-ylenemethyl group.

Compounds of the general formula IV are described in United Kingdom Pat. Specification No. 1132821.

Yet other suitable acrylates are those of the general formula

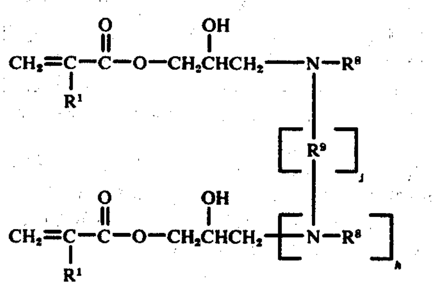

V where each $R^1$ has the meaning previously assigned, each $R^8$ denotes —H or an alkyl radical of 1 to 6 carbon atoms, optionally substituted by a cyano or hydroxyl group or by a group of formula

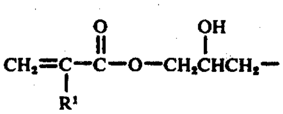

each $R^9$ is a divalent aliphatic, aromatic, heterocyclic or cycloaliphatic residue of 1 to 10 carbon atoms, linking through carbon atoms thereof the indicated nitrogen atoms,

*h* is zero or an integer of from 1 to 3, and

*j* is zero or *h*.

$R^8$ preferably denotes an isopropyl group.

$R^9$ preferably denotes an ethylene, propylene, or p-phenylene group.

A specific example of a compound of the general formula V is that of the formula

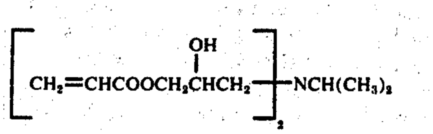

VI

Compounds of the general formula V are described in United Kingdom Pat. Specification No. 1339017.

Organic hydroperoxides which may be used as polymerisation catalysts include those of formula $R^{10}OOH$, where $R^{10}$ is a monovalent organic radical containing up to 18 carbon atoms, especially an alkyl, aryl, or aralkyl radical containing from 4 to 13 carbon atoms. Typical hydroperoxides are ethyl methyl ketone hydroperoxide, tert.butyl hydroperoxide, cumene hydroperoxide, and hydroperoxides formed by the oxygenation of cetene or cyclohexene, tert.butyl hydroperoxide and cumene hydroperoxide being especially effective. Hydrogen peroxide may also be employed. A range of organic peroxides may be used, such as 2,5-dimethyl-2,5-di(tert.butylperoxy) hexane, di-tert.butyl peroxide, dihexylene glycol peroxide, tert.butyl cumyl peroxide, isobutyl methyl ketone peroxide, and also peresters such as tert.butyl perbenzoate, and tert.butyl perphthalate.

Suitable accelerators (c) include polyalkylenepolyamines, specific examples being diethylenetriamine and triethylenetetramine; polyisocyanates, such as toluene-2,4-di-isocyanate; aldimines; tertiary amines, such as N,N-dimethylbenzylamine and triethylamine; imides and sulfimides, such as o-benzoic sulfimide; dithiocarbamates; amides and thioamides such as formamide; thiazoles such as 2-mercaptobenzthiazole; ascorbic acid; organic phosphites, quaternary ammonium salts and bases; salts of transition metals; thioureas; and polymercaptans, especially esters of mercaptancarboxylic acids, such as glycerol tris(thioglycollate). Polymercaptans and polyalkylenepolyamines are particularly preferred, and the accelerating effect of polyalkylenepolyamines can often be enhanced by including a stoichiometric deficit (calculated on the amino-hydrogen content) of a monocarboxylic acid, alkanoic and alkenoic acids such as n-heptanoic acid and acrylic acid being particularly suitable.

The amount of hydroperoxide or peroxide (b) may vary between 0.01% and 15% by weight of the ester (a); quantities of from 1% to 10% by weight are, however, generally used. The amount of accelerator (c) used is also preferably from 1 to 10% by weight of the ester (a).

The anaerobic adhesive may also contain various additives, such as inhibitors to prevent premature polymerisation, diluents, and thickeners. Typical inhibitors are quinones or hydroquinones: they may be employed in quantities of 0.001 to 0.1% by weight of the ester (a). It is generally desirable that the anaerobic adhesive is a liquid of low viscosity and it may be useful to add a diluent to lower the viscosity.

Anaerobic adhesives are, in the absence of the accelerator (c), stable for prolonged periods in the presence of a sufficient quantity of oxygen but cure when oxygen is excluded. They are therefore best stored in containers which have an adequate air space therein and/or are permeable to air.

The proportion of anaerobic adhesive to particulate material is usually from 0.5 to 10%, and especially 1 to 5%, by weight; larger amounts may be used but may prove uneconomic: the proportions are, of course, chosen so that the shaped article is permeable, for displacement of the oxygen-containing gas.

The anaerobic adhesive may be mixed with the particulate material by any known method. If desired, where the anaerobic adhesive comprises two interacting substances, such as components (a) and (b) above, the particulate material may be divided into two portions, the first of which is coated with component (a)

and the second with component (b). The accelerator (c), if used, may be mixed with either portion. Coating may be carried out by, for example, using a laboratory mixer, by tumbling in a rotating drum, by spraying, or, by dipping. The coated portions are stored separately until required, at which time they are brought into intimate contact and curing is caused to proceed. When the particulate material is a foundry refractory material it is particularly convenient to use an apparatus for mixing and discharging the sand directly into core boxes, such as that described in United Kingdom Specification No. 1133255.

The following Examples illustrate the invention: temperatures are in degrees Celsius.

The acrylates and methacrylates employed were made as described below. Epoxide contents were measured by titrating against a 0.1 N solution of perchloric acid in acetic acid in the presence of excess of tetraethylammonium bromide, a crystal violet being used as the indicator.

Product A

This is substantially 1,4-bis(2-hydroxy-3-methacryloyloxypropoxy)butane, which was prepared by adding, to a stirred mixture of methacrylic acid (67 g), triethylamine (1 g), and hydroquinone (0.1 g) heated at 120° in a flask fitted with a reflux condenser, 100 g of butane-1,4-diol diglycidyl ether (epoxide content 7.8 equiv./kg) over 1 hour and stirring the mixture at 120° for 1 hour longer, by which time its epoxide content was zero.

PRODUCT B

This is substantially 1-(2-hydroxy-3-methacryloyloxypropoxy)butane, which was prepared in a similar manner from 60.6 g of methacrylic acid and 100 g of n-butyl glycidyl ether (epoxide content 7.05 equiv./kg) in the presence of 2 g of triethylamine and 0.1 g of hydroquinone.

Product C

A mixture of adipic acid (30 g), glycidyl methacrylate (58.2 g), triethylamine (1 g), and hydroquinone (0.1 g) was heated at 120° for 2½ hours with stirring in a flask fitted with a reflux condenser. At this time the epoxide content of the product was zero.

Product C is substantially bis (2-hydroxy-3-methacryloyloxypropyl) adipate.

PRODUCT D

This is substantially 2-hydroxy-3-methacryloyloxypropyl propionate (glycerol methacrylate propionate), which was prepared by heating at 120° a stirred mixture of glycidyl methacrylate (50 g), propionic acid (26 g), triethylamine (0.7 g), and hydroquinone (0.07 g) for 2.5 hours, by which time the epoxide content of the mixture was zero.

PRODUCT E is tetraethylene glycol diacrylate.

PRODUCT F is tetraethylene glycol bis (methacrylate).

PRODUCT G

To a mixture of methacrylic acid (61 g), hydroquinone (0.2 g), and triethylamine (2 g), stirred at 120°, was added over 1 hour a mixture of 80 g of butane-1,4-diol diglycidyl ether (epoxide content 7.7 equiv./kg) and 20 g of an epoxy novalak resin (having an epoxide content of 5.48 equiv./kg and being a polyglycidyl ether of a phenol-formaldehyde novalak which had a number average molecular weight of 420). The mixture was stirred at 120° for 1 hour further, at which time the epoxide content was zero.

Product G is a mixture of 1,4-bis(2-hydroxy-3-methacryloyloxy)butane and a poly(3-methacryloyloxy-2-hydroxypropyl) ether of a phenol-formaldehyde novolak, having the formula

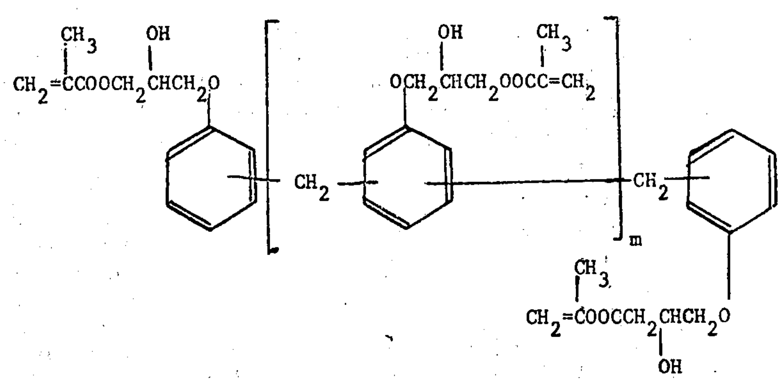

where *m* is an integer of average value 2.07.

PRODUCT H

To 87 g of toluene di-isocyanate (a mixture of the 2,4- and 2,6-isomers) was added with stirring 65 g of 2-hydroxyethyl methacrylate. An exothermic reaction set in and the temperature was allowed to rise to 90° within 10 minutes. Then a further 66 g of 2-hydroxyethyl methacrylate was added over 30 minutes without any heating. Hydroquinone (0.2 g) was added and the mixture was then stirred at 100° for 1 hour.

Product H is a mixture of 2,4- and 2,6-bis(2-methacryloyloxyethoxycarbonamido)toluene, substantially of the formula

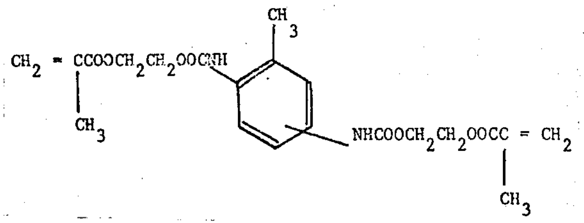

PRODUCT I is 1,1,1-trimethylolpropane tris(methacrylate).

PRODUCT J

To a stirred mixture of Product A (166 g) and toluene (300 g) at 65° was added methacryloyl chloride (16 g, i.e. 0.2 equiv., calculated on the hydroxyl content of Product A) dropwise over 30 minutes. The mixture was then stirred at 80° for 2 hours, and the solvent was removed under reduced pressure. Product J comprises a mixture of 1,4-bis(2-hydroxy-3-methacryloxypropoxy)butane, 1-(2,3-bis(methacryloyloxy-propoxy)-4-(2-hydroxy-3-methacryloxypropoxy)butane, and 1,4bis(2,3-bis(methacryloyloxypropoxy)-4-(2-hydroxy-3-methacryloyloxypropoxy) butane, and 1,4-bis(2,3-bis(methacryloyloxy)propoxy)butane.

EXAMPLE I

The following compositions were prepared, the figures denoting parts by weight

| | | |
|---|---|---|
| I | 90<br>5<br>5<br>4900 | Product A<br>cumene hydroperoxide<br>triethylenetetramine<br>sand |
| II | 90<br>5<br>5<br>2.5<br>5022 | Product A<br>cumene hydroperoxide<br>triethylenetetramine<br>n-heptanoic acid<br>sand |
| III | 90<br>5<br>5<br>2.5<br>5022 | Product A<br>cumene hydroperoxide<br>triethylenetetramine<br>methacrylic acid<br>sand |
| IV | 90<br>5<br>5<br>2.5<br>5022 | Product A<br>cumene hydroperoxide<br>glycerol trithioglycollate<br>methacrylic acid<br>sand |
| V | 90<br>5<br>5<br>2.5<br>5022 | Product B<br>cumene hydroperoxide<br>triethylenetetramine<br>methacrylic acid<br>sand |
| VI | 90<br>5<br>5<br>4900 | Product C<br>cumene hydroperoxide<br>triethylenetetramine<br>sand |
| VII | 90<br>5<br>5<br>4900 | Product D<br>cumene hydroperoxide<br>triethylenetetramine<br>sand |
| VIII | 90<br>5<br>5<br>4900 | Product E<br>cumene hydroperoxide<br>triethylenetetramine<br>sand |
| IX | 90<br>5<br>5<br>4900 | Product F<br>cumene hydroperoxide<br>triethylenetetramine<br>sand |
| X | 90<br>5<br>5<br>8233 | Product G<br>cumene hydroperoxide<br>triethylenetetramine<br>sand |
| XI | 90<br>5<br>5<br>4900 | Product G<br>cumene hydroperoxide<br>triethylenetetramine<br>sand |
| XII | 90<br>5<br>5<br>4066 | Product G<br>cumene hydroperoxide<br>triethylenetetramine<br>sand |
| XIII | 85<br>5<br>10<br>5845 | Product G<br>cumene hydroperoxide<br>triethylenetetramine<br>sand |
| XIV | 45<br>45<br>5<br>5<br>5022 | Product F<br>Product H<br>cumene hydroperoxide<br>triethylenetetramine<br>sand |

The sand used, Chelford W & S sand, is a washed and screened foundry sand from Chelford, Cheshire, England, having the following typical sieve analysis:-

| British Standard Sieve No. | % by weight retained |
|---|---|
| 16 | trace |
| 22 | 0.8 |
| 30 | 4.2 |
| 44 | 20.4 |
| 60 | 45.3 |
| 100 | 26.0 |
| 150 | 2.8 |
| 200 | 0.3 |
| > 200 | trace |

The sand was mixed with the other components of the Compositions except the triethylenetetramine or glycerol trithiogycollate; the latter were then added and mixed vigorously for a few seconds, Similar results could be obtained by first mixing the sand with the triethylenetetramine or glycerol trithiogycollate and then adding the other components. The Compositions were used within a few minutes of mixing to produce a standard AFS (American Foundrymen's Society) compression test piece 5 × 5 cm. When making the compression pieces using Compositions II–V the mixtures were used within one minute of preparation. Cure was initiated by blowing nitrogen (at 18 kN/m²) through the core for the time indicated. The time piece was crushed either immediately after removal from the core box or after storage at room temperature in a nitrogen atmosphere. The results are summarised in Table I.

Other compression pieces were produced using carbon dioxide at 18 kN/m² in place of nitrogen, and the results are shown in Table II.

Table I

| Composition | % adhesive on sand | Passage of nitrogen in core box (secs) | Storage period in nitrogen (mins) | Compression strength (kN/m²) |
|---|---|---|---|---|
| I | 2.0 | 30 | — | 186 |

Table I-continued

| Composition | % adhesive on sand | Passage of nitrogen in core box (secs) | Storage period in nitrogen (mins) | Compression strength (kN/m²) |
|---|---|---|---|---|
| | | 60 | — | 384 |
| | | 60 | 60 | 5706 |
| II | 2.0 | 30 | — | 450 |
| III | 2.0 | 10 | — | 281 |
| | | 30 | — | 659 |
| | | 10 | 5 | 2677 |
| | | 10 | 10 | 3774 |
| | | 10 | 30 | 4899 |
| IV | 2.0 | 120 | — | 1835 |
| V | 2.0 | 120 | — | 275 |
| VI | 2.0 | 60 | — | 219 |
| | | 60 | 30 | 4658 |
| VII | 2.0 | 120 | — | 439 |
| VIII | 2.0 | 120 | — | 97 |
| IX | 2.0 | 60 | — | 237 |
| | | 60 | 60 | 5713 |
| X | 1.2 | 60 | — | 154 |
| XI | 2.0 | 60 | — | 230 |
| XII | 2.4 | 30 | — | 121 |
| | | 60 | — | 248 |
| | | 120 | — | 505 |
| | | 300 | — | 1139 |
| | | 600 | — | 1780 |
| | | 60 | 60 | 4043 |
| XIII | 2.0 | 30 | — | 154 |
| | | 60 | — | 384 |
| XIV | 2.0 | 60 | — | 800 |

TABLE II

| Composition | % adhesive on sand | Passage of carbon dioxide in core box (secs) | Compression strength (kN/m²) |
|---|---|---|---|
| I | 2.0 | 60 | 154 |
| III | 2.0 | 30 | 395 |

EXAMPLE 2

The procedure of Example 1 was repeated, using the following Compositions:

| | | |
|---|---|---|
| XV | 90 | Product I |
| | 5 | cumene hydroperoxide |
| | 2.5 | methacrylic acid |
| | 5 | triethylenetetramine |
| | 5125 | sand |
| XVI | 75 | Product A |
| | 15 | Product I |
| | 5 | cumene hydroperoxide |
| | 2.5 | methacrylic acid |
| | 5 | triethylenetetramine |
| | 5125 | sand |
| XVII | 75 | Product A |
| | 15 | Product I |
| | 5 | cumene hydroperoxide |
| | 2.5 | methacrylic acid |
| | 5 | triethylenetetramine |
| | 3416 | sand |
| XVIII | 82.5 | Product A |
| | 7.5 | Product I |
| | 5 | cumene hydroperoxide |
| | 5 | triethylenetetramine |
| | 2.5 | methacrylic acid |
| | 5125 | sand |
| XIX | 90 | Product J |
| | 5 | cumene hydroperoxide |
| | 5 | triethylenetetramine |
| | 2.5 | methacrylic acid |
| | 5125 | sand |

None of the cores was stored in nitrogen after nitrogen had been passed into the core box for the time indicated.

Table III shows the results obtained.

TABLE III

| Composition | % adhesive on sand | Passage of nitrogen in core box (secs) | Compression strength (kN/m²) |
|---|---|---|---|
| XV | 2.0 | 10 | 436 |
| | | 20 | 579 |
| | | 30 | 1245 |
| | | 60 | 1712 |
| XVI | 2.0 | 10 | 664 |
| | | 20 | 961 |
| | | 30 | 1036 |
| | | 60 | 1634 |
| XVII | 3.0 | 10 | 820 |
| | | 20 | 1084 |
| | | 30 | 1250 |
| | | 60 | 1606 |
| XVIII | 2.0 | 10 | 532 |
| | | 20 | 700 |
| | | 30 | 748 |
| | | 60 | 1349 |
| XIX | 2.0 | 10 | 522 |
| | | 20 | 605 |
| | | 30 | 823 |
| | | 60 | 1298 |

EXAMPLE 3

The procedure of Example I was repeated with Composition III, but passing nitrogen at a pressure of 36 kN/m², the period of passage of nitrogen and of storage in nitrogen being varied.

The results obtained are shown in Table IV.

TABLE IV

| Composition | % adhesive on sand | Passage of nitrogen in core box (secs) | Storage period in nitrogen (mins) | Compression strength (kN/m²) |
|---|---|---|---|---|
| III | 2.0 | 10 | — | 257 |

TABLE IV-continued

| Composition | % adhesive on sand | Passage of nitrogen in core box (secs) | Storage period in nitrogen (mins) | Compression strength ($kN/m^2$) |
|---|---|---|---|---|
| | | 20 | — | 400 |
| | | 30 | — | 813 |
| | | 60 | — | 1432 |
| | | 120 | — | 2745 |
| | | 240 | — | 3294 |
| | | 360 | — | 3601 |
| | | 600 | — | 5095 |
| | | 10 | 1 | 608 |
| | | 10 | 2 | 1537 |
| | | 10 | 5 | 3628 |
| | | 10 | 10 | 3953 |
| | | 10 | 20 | 5270 |
| | | 10 | 30 | 6456 |
| | | 6 | 60 | 6698 |

EXAMPLE 4

Compositions XX - XXIII were made by adding to Composition III 2 parts of, respectively, 2-(3,4-epoxycyclohexyl)ethyltrimethoxysilane, 3-(2,3-epoxypropyloxy) propyltrimethoxysilane, and 3-(methacryloyloxy)-propyltri-methoxysilane as adhesion promoters. Cores were then prepared as described in Example I from these Compositions, and nitrogen at 18 $kN/m^2$ pressure was passed into the cores for 60 seconds at room temperature. The compression strengths of the cores were, respectively, 1126, 1263, and 1520 $kN/m^2$.

We claim:

1. A method of making a foundry mold or core from foundry sand which comprises (i) mixing a foundry sand and 0.5 to 10% by weight, calculated on the weight of the sand, of an anaerobically curing adhesive, said adhesive comprising (a) an ester of an acrylic acid and (b) a hydroperoxide or peroxide as polymerization catalyst for said ester, and molding the mixture to the desired shape, said mixing being performed in the presence of sufficient oxygen to prevent polymerization of said adhesive, and (ii) curing the adhesive in order to bond the particles of sand together by maintaining the foundry mold or core in a substantially oxygen-free environment.

2. Method according to claim 1, in which the substantially oxygen-free environment is attained by displacing air or other oxygen-containing gas by a gas or vapor which does not inhibit curing of the anaerobic adhesive.

3. Method according to claim 2, in which the air or other oxygen-containing gas is displaced by nitrogen.

4. Method according to claim 1, in which the foundry mold or core is maintained in a substantially oxygen-free environment for a minimum of 10 minutes.

5. Method according to claim 1, in which ingress of air into the foundry mold or core while the adhesive is curing is prevented by wrapping the shaped article in an air-impermeable film.

6. Method according to claim 1, in which ingress of air into the foundry mold or core while the adhesive is curing is prevented by coating the foundry mold or core with an air-impermeable sealing composition formed in situ by coating the surface of the foundry mold or core with an aerobically-curing agent for the adhesive.

7. Foundry molds or cores made by the method of claim 1.

8. Method according to claim 1, in which the ester (a) is of the general formula

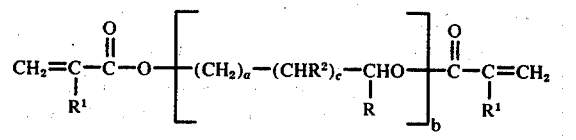

where

*a* is an integer of 1 to 8,

*b is an integer of* 1 to 20,

*c* is zero or 1,

R denotes —H, —Ch3, —$CH_3$, —$C_2H_5$, —$CH_2OH$, or

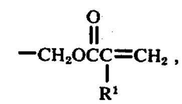

$R^2$ denotes —H, —OH, or

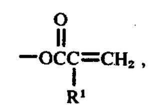

and $R^1$ denotes —H, —Cl, —$CH_3$, or —$C_2H_5$.

9. Method according to claim 1, in which the ester (a) is of the general formula

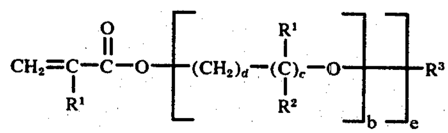

where

*b*, *c*, $R^1$ and $R^2$ have the meaning assigned in claim 8,

*d* is zero or a positive integer, provided that *c* and *d* are not both zero,

*e* is 1, 2, 3, or 4, and $R^3$ denotes an organic radical of valency *e*, linked through a carbon atom or carbon atoms thereof to the indicated b oxygen atoms.

10. Method according to claim 9, in which $R^3$ is the hydrocarbon residue of an aliphatic alcohol containing from 1 to 6 carbon atoms.

11. Method according to claim 1, in which the ester (a) is of the general formula

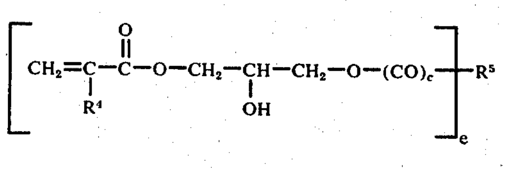

where c has the meaning assigned in claim 8, e has the meaning assigned in claim 9, $R^4$ denotes —H or —$CH_3$, and $R^5$ denotes an organic radical of valency e, linked through a carbon atom other than the carbon atom of a carbonyl group.

12. Method according to claim 11, in which e is zero and $R^5$ denotes the residue, containing from 1 to 18 carbon atoms, of an alcohol or phenol having e hydroxy groups.

13. Method according to claim 11, in which *c* is 1 and $R^5$ denotes the residue, containing from 1 to 60 carbon atoms, of an acid having e carboxyl groups.

14. Method according to claim 1, in which the ester (a) is of the general formula

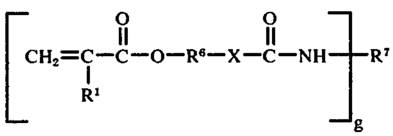

where $R^1$ has the meaning assigned in claim 8,

$R^6$ denotes a divalent aliphatic, cycloaliphatic, aromatic, or araliphatic group, bound through a carbon atom or carbon atoms thereof to the indicated —O— atom and —X— atom or group, X denotes —O— or —N($R^8$), where $R^8$ stands for —H or an alkyl radical of from 1 to 8 carbon atoms,

*g* is an integer of at least 2 and at most 6, and $R^7$ denotes a g-valent aliphatic, cycloaliphatic, aromatic, or araliphatic group, bound through a carbon atom or carbon atoms thereof to the indicated NH groups.

15. Method according to claim 14, in which $R^6$ denotes a divalent aliphatic group of 2 to 6 carbon atoms.

16. Method according to claim 14, in which $R^7$ denotes a divalent aliphatic group of 2 to 10 carbon atoms; a phenylene group, optionally substituted by a methyl group or a chlorine atom; a naphthalene group; a group of formula $—C_6H_4C_6H_4—$, $—C_6H_4CH_2C_6H_4—$, or $—C_6H_4C(CH_3)_2C_6H_4—$; or a mononuclear alkylcycloalkylene or alkylcycloalkylalkylene group of 6 to 10 carbon atoms.

17. Method according to claim 1, in which the ester (a) is of the general formula

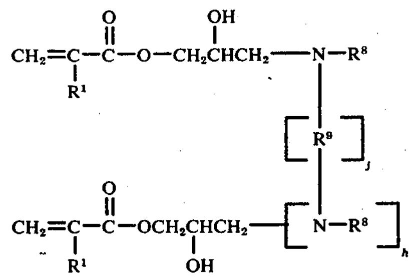

where each $R^1$ has the meaning assigned in claim 8, each $R^8$ denotes —H or an alkyl radical of 1 to 6 carbon atoms, optionally substituted by a cyano or hydroxyl group or by a group of formula

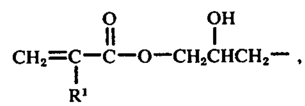

each $R^9$ is a divalent aliphatic, aromatic, heterocyclic, or cycloaliphatic residue of 1 to 10 carbon atoms, linking through carbon atoms thereof the indicated nitrogen atoms,

*h* is zero or an integer of from 1 to 3, and

*j* is zero or *h*.

18. Method according to claim 1 in which the ester (a) is 1,4-bis(2-hydroxy-3-methacryloyloxypropoxy)-butane, 1-(2-hydroxy-3-methacryloyloxypropoxy)butane, bis(2-hydroxy-3-methacryloyloxypropyl) adipate, 2-hydroxy-3-(methacryloyloxy)propyl propionate, tetraethylene glycol diacrylate, tetraethylene glycol bis (methacrylate), a poly (2-hydroxy-3-(methacryloyloxy)propyl)ether of a phenol-formaldehyde novolak, 2,4-bis(2-methacryloyloxyethoxycarbonamido)toluene, 2,6-bis(2-methacryloyloxyethoxycarbonamido)-toluene, 1,1,1-trimethylolpropane tris(methacrylate), 1-(2,3-bis(methacryloxyloxy)propoxy)-4-(2-hydroxy-3-methacryloyloxpropoxy)butane, or 1,4-bis(2,3-bis(methacryloyloxypropoxy)butane.

19. Method according to claim 1, in which the hydroperoxide (b) is of the formula $R^{10}OOH$, where $R^{10}$ denotes a monovalent organic radical containing up to 18 carbon atoms.

20. Method according to claim 1, in which the anaerobic adhesive contains an accelerator (c).

21. Method according to claim 20, in which the accelerator is a polyalkylenepolyamine or a polymercaptan.

22. Method according to claim 1, in which there is used from 0.01 to 15% of the polymerisation catalyst (b), calculated on the weight of the anaerobic adhesive.

23. Method according to claim 20, in which the anaerobic adhesive contains from 1 to 10% of the accelerator (c) calculated on the weight of the ester (a).

* * * * *